United States Patent
Dabbagh et al.

(10) Patent No.: US 10,659,188 B2
(45) Date of Patent: May 19, 2020

(54) TRANSMITTER LINK ENHANCEMENT TECHNIQUES

(71) Applicant: QUALCOMM Incorporated, San Diego, CA (US)

(72) Inventors: Amir Dabbagh, Haifa (IL); Reuven Alpert, Givat Ada (IL); Ziv Golan, Pardes-Hanna (IL); Hezi Hezkiyahu, Binyamina (IL)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/039,718

(22) Filed: Jul. 19, 2018

(65) Prior Publication Data

US 2019/0028230 A1 Jan. 24, 2019

Related U.S. Application Data

(60) Provisional application No. 62/535,543, filed on Jul. 21, 2017.

(51) Int. Cl.
*H04L 1/00* (2006.01)
*H04L 1/20* (2006.01)
(Continued)

(52) U.S. Cl.
CPC ......... *H04L 1/0003* (2013.01); *H04B 7/0413* (2013.01); *H04B 7/0617* (2013.01);
(Continued)

(58) Field of Classification Search
CPC ... H04L 1/0003; H04L 1/0002; H04L 1/0009; H04L 1/203; H04L 5/0048;
(Continued)

(56) References Cited

U.S. PATENT DOCUMENTS 7,627,051 B2   12/2009   Shen et al.
7,933,629 B2   4/2011    Kwon et al.
(Continued)

FOREIGN PATENT DOCUMENTS

WO   WO-2014070049 A1   5/2014

OTHER PUBLICATIONS

Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005 (Aug. 1, 2005), pp. 3042-3056, XP011136488, ISSN: 1053-587X, DOI: DOI:10.1109/TSP.2005.851109.
(Continued)

*Primary Examiner* — Eric Myers
(74) *Attorney, Agent, or Firm* — Steven R. Theil; Patterson & Sheridan LLP

(57) ABSTRACT

Techniques and apparatus for efficiently performing rate selection and transmit gain selection are provided. The techniques may be performed, for example, by a transmitting entity in the absence of explicit MCS selection reporting by a receiving entity. One technique includes outputting first packets for transmission using a first modulation and coding scheme (MCS) value and via a transmit power amplifier (PA) configured according to a transmit gain parameter associated with the first MCS value. Feedback indicating whether the first packets have been received is obtained, a second MCS value for second packets is selected based on the feedback, and the transmit gain parameter is adjusted if one or more criteria are met. Second packets are output for transmission using the second MCS value and, thereafter, additional packets are output for transmission based on the first MCS value and the adjusted transmit gain parameter.

20 Claims, 9 Drawing Sheets

(51) Int. Cl.
    *H04B 17/336* (2015.01)
    *H04B 7/0413* (2017.01)
    *H04B 7/06* (2006.01)
    *H04L 5/00* (2006.01)
    *H04L 12/26* (2006.01)

(52) U.S. Cl.
    CPC ......... *H04B 17/336* (2015.01); *H04L 1/0002* (2013.01); *H04L 1/0009* (2013.01); *H04L 1/203* (2013.01); *H04L 5/0048* (2013.01); *H04L 43/0823* (2013.01); *H04L 5/0007* (2013.01)

(58) Field of Classification Search
    CPC . H04L 43/0823; H04L 5/0007; H04B 17/336; H04B 7/0413; H04B 7/0617
    See application file for complete search history.

(56) References Cited

U.S. PATENT DOCUMENTS

| | | |
|---|---|---|
| 8,270,426 B2 | 9/2012 | Choi et al. |
| 8,300,716 B1 | 10/2012 | Lee et al. |
| 2005/0101259 A1 | 5/2005 | Tong et al. |
| 2015/0245326 A1* | 8/2015 | Rune ............... H04L 1/0003 370/329 |
| 2016/0150524 A1 | 5/2016 | Ramkumar et al. |

OTHER PUBLICATIONS

International Search Report and Written Opinion—PCT/US2018/043108—ISA/EPO—dated Oct. 15, 2018.

* cited by examiner

TRANSMITTER LINK ENHANCEMENT TECHNIQUES

CROSS-REFERENCE TO RELATED APPLICATION

This application claims the benefit of and priority to U.S. Provisional Patent Application No. 62/535,543, filed Jul. 21, 2017, which is assigned to the assignee hereof and hereby expressly incorporated by reference herein.

BACKGROUND

I. Field of the Disclosure

Certain aspects of the present disclosure generally relate to wireless communications and, more particularly, to techniques and apparatus for adapting modulation coding schemes based on channel conditions.

II. Description of Related Art

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a first interface, a second interface, and a processing system. The first interface is configured to output first packets for transmission using a first modulation and coding scheme (MCS) value and via a transmit power amplifier (PA) configured according to a transmit gain parameter associated with the first MCS value. The second interface is configured to obtain feedback indicating whether the first packets have been received. The processing system is configured to select a second MCS value for second packets based on the feedback and adjust the transmit gain parameter if one or more criteria are met. The first interface is also configured to output the second packets for transmission using the second MCS value and, thereafter, to output additional packets for transmission based on the first MCS value and the adjusted transmit gain parameter.

Certain aspects of the present disclosure provide a method for wireless communications that may be performed, for example, by an apparatus. The method generally includes outputting first packets for transmission using a first modulation and coding scheme (MCS) value and via a transmit power amplifier (PA) configured according to a transmit gain parameter associated with the first MCS value. The method also includes obtaining feedback indicating whether the first packets have been received, selecting a second MCS value for second packets based on the feedback, and adjusting the transmit gain parameter if one or more criteria are met. The method further yet includes outputting the second packets for transmission using the second MCS value and, thereafter, outputting additional packets for transmission based on the first MCS value and the adjusted transmit gain parameter.

Certain aspects of the present disclosure provide an apparatus for wireless communications. The apparatus generally includes means for outputting first packets for transmission using a first modulation and coding scheme (MCS) value and via a transmit power amplifier (PA) configured according to a transmit gain parameter associated with the first MCS value. The apparatus also includes means for obtaining feedback indicating whether the first packets have been received, means for selecting a second MCS value for second packets based on the feedback, and means for adjusting the transmit gain parameter if one or more criteria are met. The apparatus further yet includes means for outputting the second packets for transmission using the second MCS value and, thereafter, outputting additional packets for transmission based on the first MCS value and the adjusted transmit gain parameter.

Certain aspects of the present disclosure provide a computer-readable medium having computer executable code stored thereon for wireless communication by an apparatus. The computer executable code includes code for outputting first packets for transmission using a first modulation and coding scheme (MCS) value and via a transmit power amplifier (PA) configured according to a transmit gain parameter associated with the first MCS value. The computer executable code also includes code for obtaining feedback indicating whether the first packets have been received, code for selecting a second MCS value for second packets based on the feedback, and code for adjusting the transmit gain parameter if one or more criteria are met. The computer executable code further yet includes code for outputting the second packets for transmission using the second MCS value and, thereafter, outputting additional packets for transmission based on the first MCS value and the adjusted transmit gain parameter.

Certain aspects of the present disclosure provide a wireless station. The wireless station includes a transmitter, a receiver, and a processing system. The transmitter is configured to transmit first packets using a first modulation and coding scheme (MCS) value and with a transmit power amplifier (PA) configured according to a transmit gain parameter associated with the first MCS value. The receiver is configured to receive feedback indicating whether the first packets have been received. The processing system is configured to select a second MCS value for second packets based on the feedback and adjust the transmit gain parameter if one or more criteria are met. The transmitter is also configured to transmit the second packets using the second MCS value and, thereafter, to transmit additional packets based on the first MCS value and the adjusted transmit gain parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
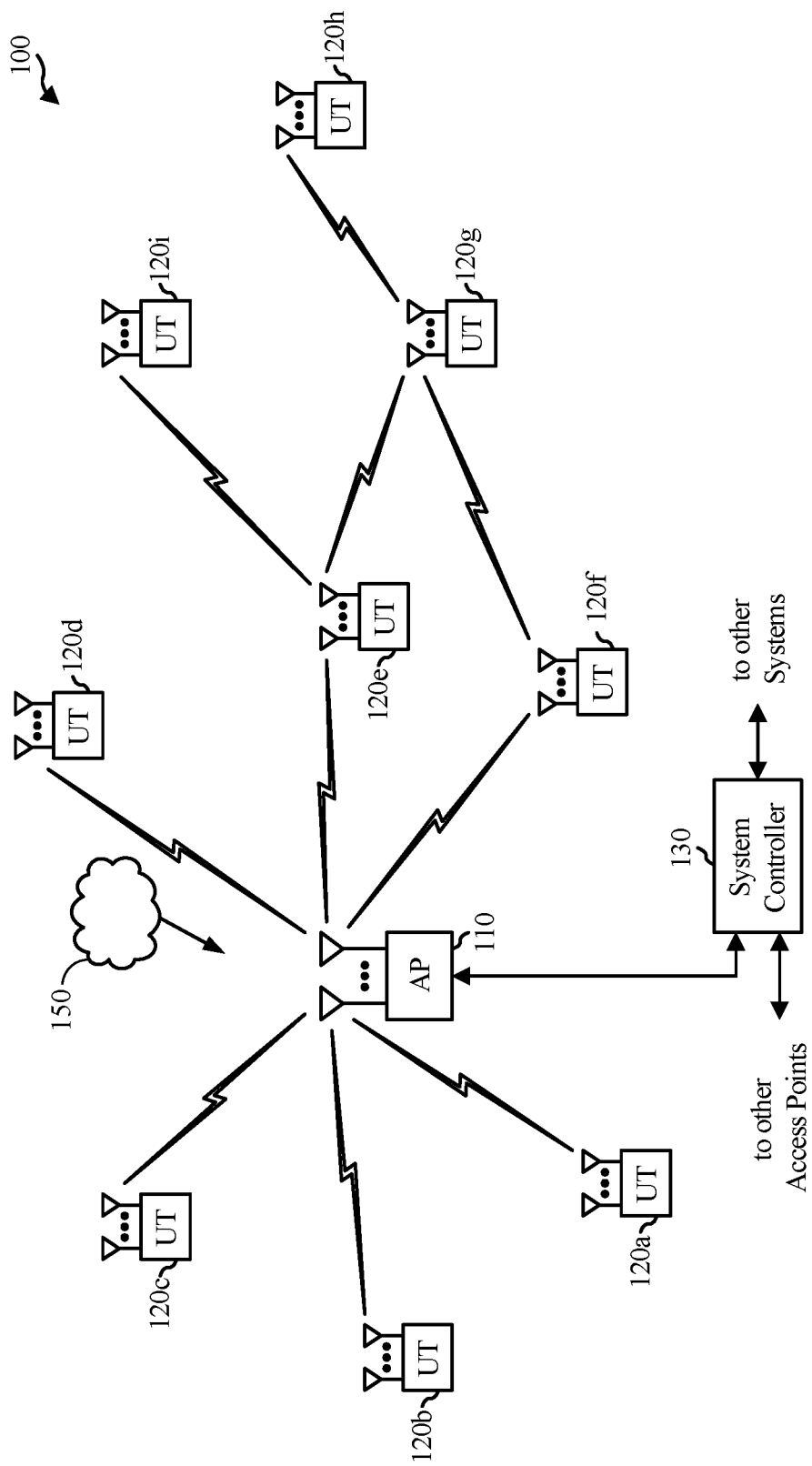
FIG. 1 is a diagram of an example wireless communications network, in accordance with certain aspects of the present disclosure.

Certain aspects of the present disclosure provide methods and apparatus for efficiently performing rate selection and transmitter gain selection. The techniques described herein may be used to adapt rate selection (e.g., modulation and coding scheme (MCS) values) to varying channel conditions or other conditions, such as network loading or application specific traffic needs, without impacting the transmitted signal quality (or error vector magnitude (EVM)).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal (UT), a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates a multiple-access multiple-input multiple-output (MIMO) system 100 with APs and UTs/STAs. The MIMO system 100 may be a multi-user MIMO system (MU-MIMO) or a single-user MIMO system (SU-MIMO). In MIMO system 100, a wireless node (e.g., AP or STA) using the techniques presented herein may be configured to perform rate selection and/or transmit gain selection in varying channel conditions without impacting the transmitted signal quality (or error vector magnitude (EVM)).

For example, the wireless node can be configured to output first packet(s) for transmission using a first MCS value and with a transmit power amplifier (PA) configured according to a first transmit gain parameter associated with the first MCS value, and obtain feedback indicating whether the first packet(s) have been received. The wireless node can select a second MCS value for second packet(s) based on the feedback, and adjust the first transmit gain parameter if one or more criteria are met. The criteria, for example, may be based on one or more packet error rate (PER) statistics determined for the first packet(s). The wireless node may output the second packet(s) for transmission using the second MCS value and, thereafter, output additional packets for transmission based on the first MCS value and the adjusted first transmit gain parameter.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with code divisional multiple access (CDMA), disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
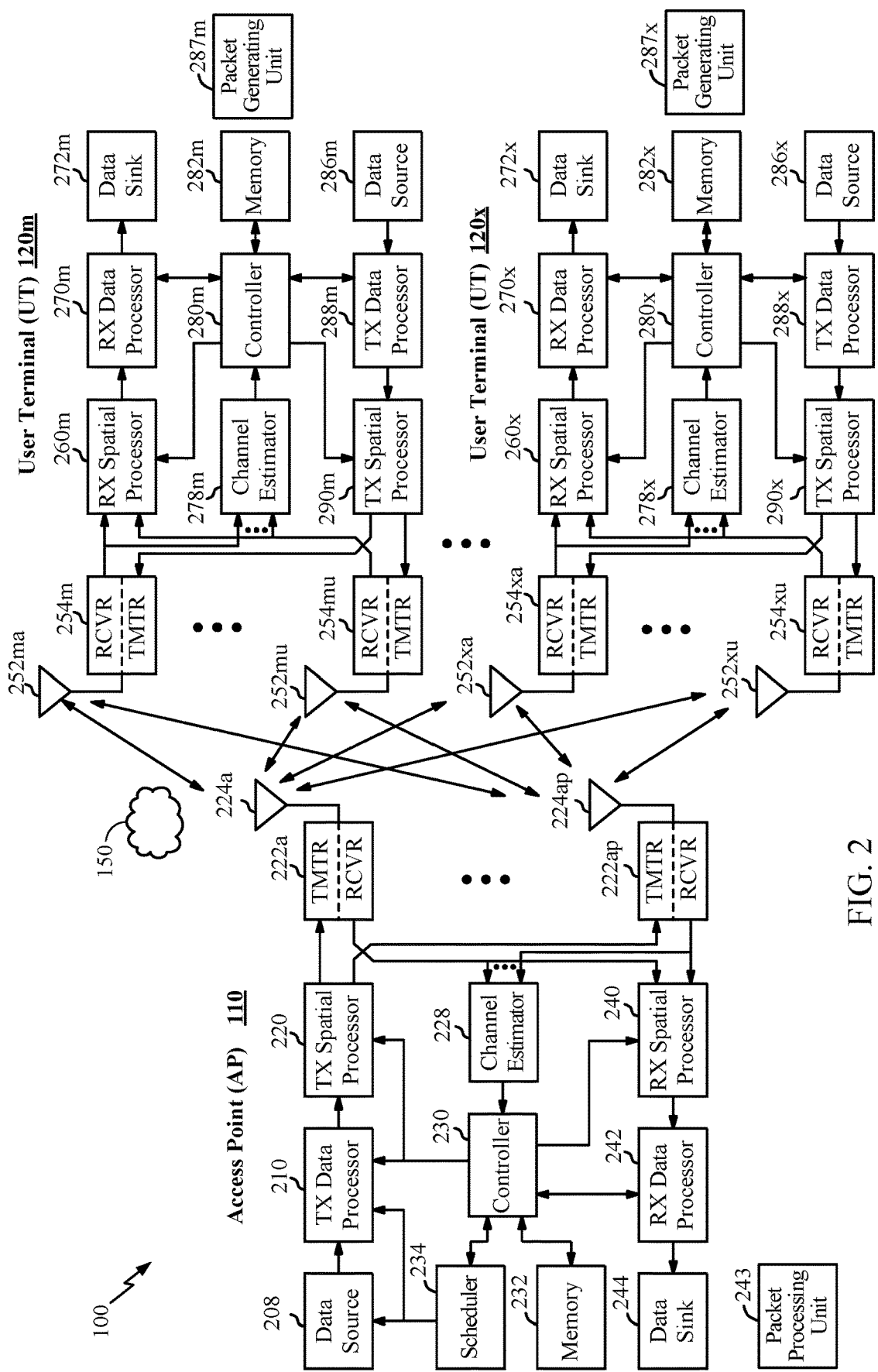
FIG. 2 is a block diagram of an example access point and example user terminals, in accordance with certain aspects of the present disclosure.

FIG. 2 illustrates example components of the AP 110 and UT/STAs 120 in MIMO system 100 illustrated in FIG. 1. One or more components of the AP 110 and UT/STAs 120 may be used to practice aspects of the present disclosure. For example, antenna(s) 224, Tx/Rx(s) 222, processors 210, 220, 240, 242, and/or controller 230 of the AP 110 may be used to perform the operations described herein and illustrated with reference to FIGS. 4, 4A, 5 and 6. Similarly, antenna(s) 252, Tx/Rx(s) 254, processors 260, 270, 288, and 290, and/or controller 280 of one or more UT/STAs 120 may be used to perform the operations described herein and illustrated with reference to FIGS. 4, 4A, 5 and 6. As described herein, communication may occur between two APs, two STAs, and/or and AP and a STA.

More specifically, FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{ap}$ receiver unts 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, signal to noise ratio (SNR) estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
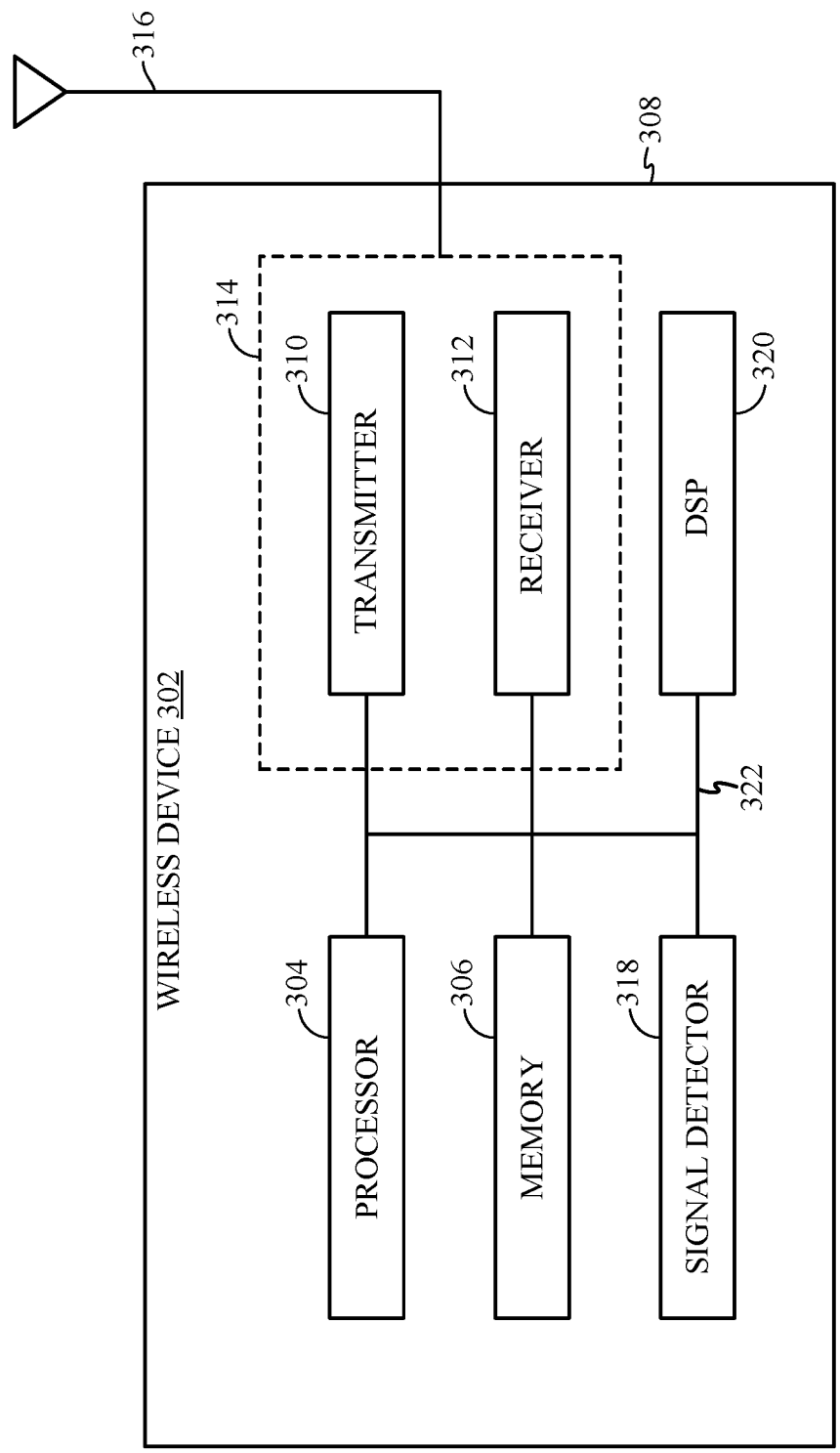
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 400, operations 500, and operations 600 illustrated in FIGS. 4-6, respectively. The wireless device 302 may be an access point (e.g., an apparatus) 110 or UT/STA (e.g., a wireless node) 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Techniques for Transmitter Link Enhancement

Certain aspects of the present disclosure provide methods and apparatus for efficiently performing rate selection and transmitter gain selection. The techniques described herein may be used to adapt rate selection (e.g., MCS values or levels) to varying channel conditions or other conditions (such as network loading or application specific traffic needs), and adapt the transmitter gain selection, such that the transmitted signal quality (e.g., EVM, receiver signal to noise ratio (SNR), etc.) is not impacted by the changing rate.

In certain communication systems (e.g., WLAN), the channel conditions between a transmitter and receiver may continuously change. In the presence of continuously changing channel conditions, the transmitter should generally adapt its transmit signal properties in order to achieve the best link and system level performance. For example, the capability of the receiver to decode different levels of data-rates at different time instances may be depend in part on the (WLAN) transmitter's ability to change the MCS level used in forming the data packets without impacting the received signal SNR. Thus, to obtain optimal system level performance, a change in MCS should not impact the SNR measured at the receiver side (or transmitted signal EVM).

However, due to implementation complexities and cost of circuit design, the transmitted signal quality may be impacted for certain MCS levels (e.g., MCS levels involving higher order modulations, such as quadrature amplitude modulation (QAM) 16, QAM 64, etc.) where power amplifier (PA) non-linearity can impact the transmitter performance. Thus, the transmitter(s) may be confronted with the problem as how to modify the MCS level such that the transmitter(s) adapts to the current channel conditions without impacting the transmitted signal EVM (or receiver SNR) given certain circuit design limitations.

Aspects of the present disclosure provide techniques for jointly optimizing the rate selection and transmitter gain selection to reduce the impact to the transmitted signal quality (or receiver SNR). As described herein, the transmitter may determine (or calculate) one or more packet error rate (PER) statistics, such as the total number of transmitted media access control protocol data units (MPDUs), the number of negative acknowledgements (NACKs) received during a time period, etc., and use the PER statistics to drive the next MCS level selection and/or Tx gain index selection (e.g., which modifies the PA input power) for maximum efficiency and optimal transmitter EVM.

By jointly optimizing for rate selection and transmitter gain selection, the transmitter can significantly reduce the impact to the transmitted signal quality for higher modulation orders, such as QAM 16, QAM 64, etc.

Figure 4:
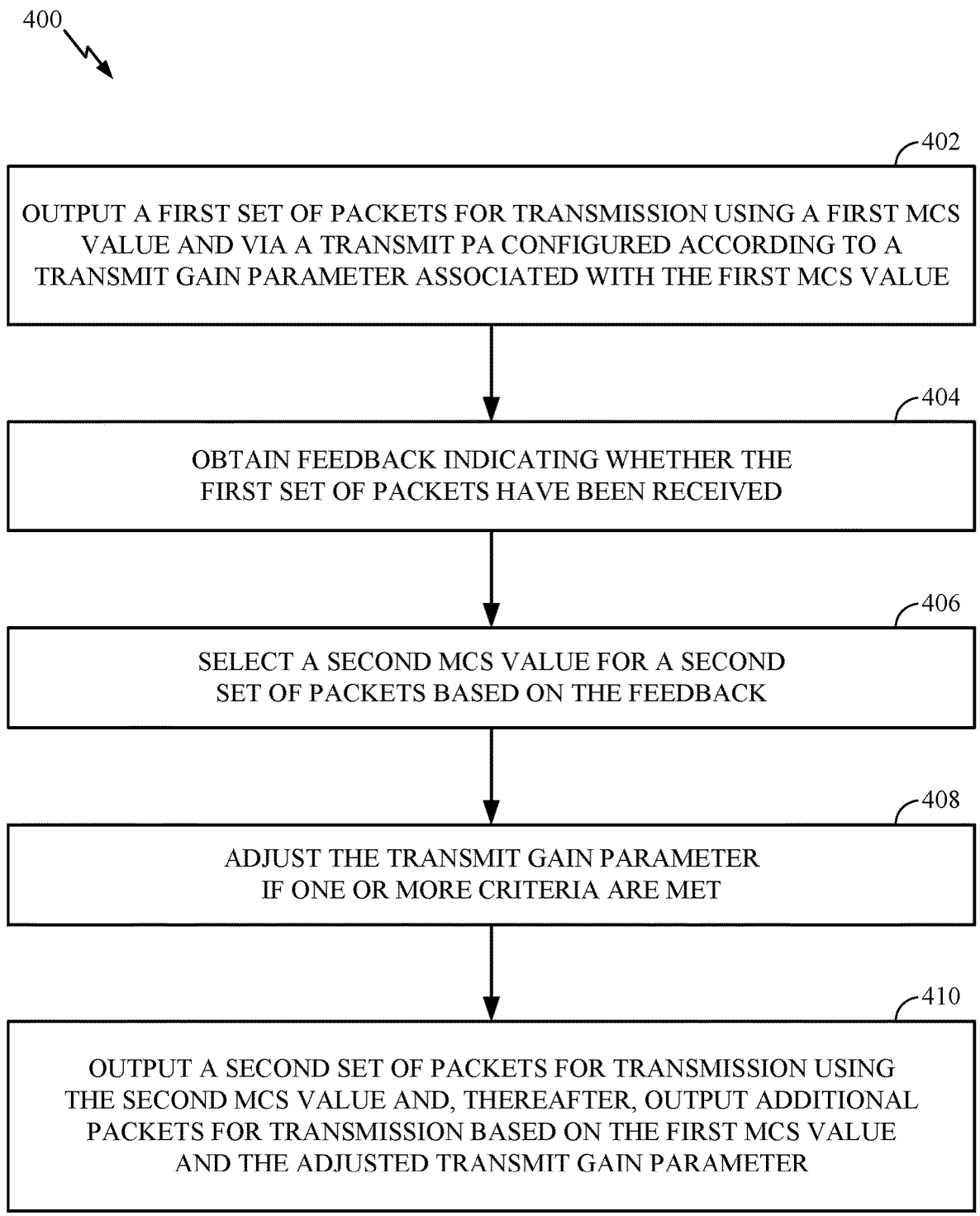
FIG. 4 is a flow diagram of example operations for rate selection and transmit gain selection for wireless communications, in accordance with certain aspects of the present disclosure.
Figure 4A:
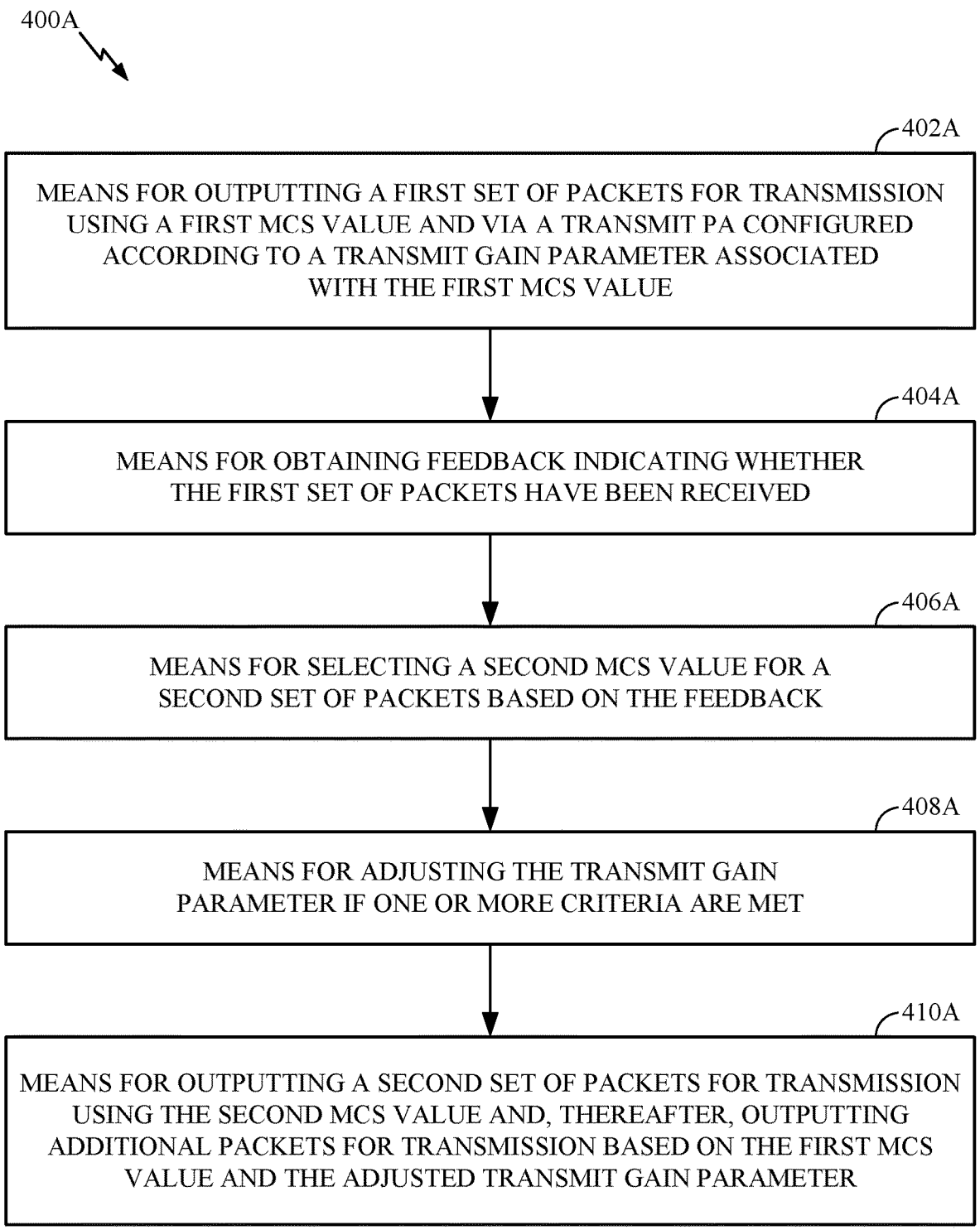
FIG. 4A illustrates example components capable of performing the operations shown in FIG. 4.

FIG. 4 illustrates example operations 400 for performing rate selection and transmitter gain selection, in accordance with certain aspects of the present disclosure. The operations 400 may be performed by a transmitting entity, for example, a wireless node, such as the access point 110 or user terminal 120 of FIG. 2 or the wireless device 302 of FIG. 3 (in the absence of explicit rate or MCS selection feedback from a receiving entity).

The operations 400 begin, at 402, where the transmitting entity outputs a first set of packets for transmission using a first MCS value and via a transmit PA configured according to a transmit gain parameter associated with the first MCS value. At 404, the transmitting entity obtains feedback indicating whether the first set of packets have been received. For example, the feedback may acknowledge or negatively acknowledge receipt of the first set of packets.

At 406, the transmitting entity selects a second MCS value for a second set of packets based on the feedback and, at 408, adjusts the transmit gain parameter if one or more criteria are met. At 410, the transmitting entity outputs the second set of packets for transmission using the second MCS value and, thereafter, outputs additional packets for transmission based on the first MCS value and the adjusted transmit gain parameter.

In certain aspects, the rate selection techniques and transmitter gain selection techniques described herein may be based on several PER related statistics. The PER statistics may be maintained per MCS value and may be updated with each physical layer convergence protocol (PLCP) protocol data unit (PPDU)/MPDU transmission. The PER statistics, per MCS, may include a minimum number of transmitted MPDUs before the rate (e.g., MCS value) can be decreased (e.g., Min_Pkt_Cnt_Down), a minimum number of transmitted MPDUs before the rate can be increased (e.g., Min_Pkt_Cnt_Up), and NACK accumulation (e.g., number of NACKs accumulated in a given period such as a TXOP).

Figure 5:
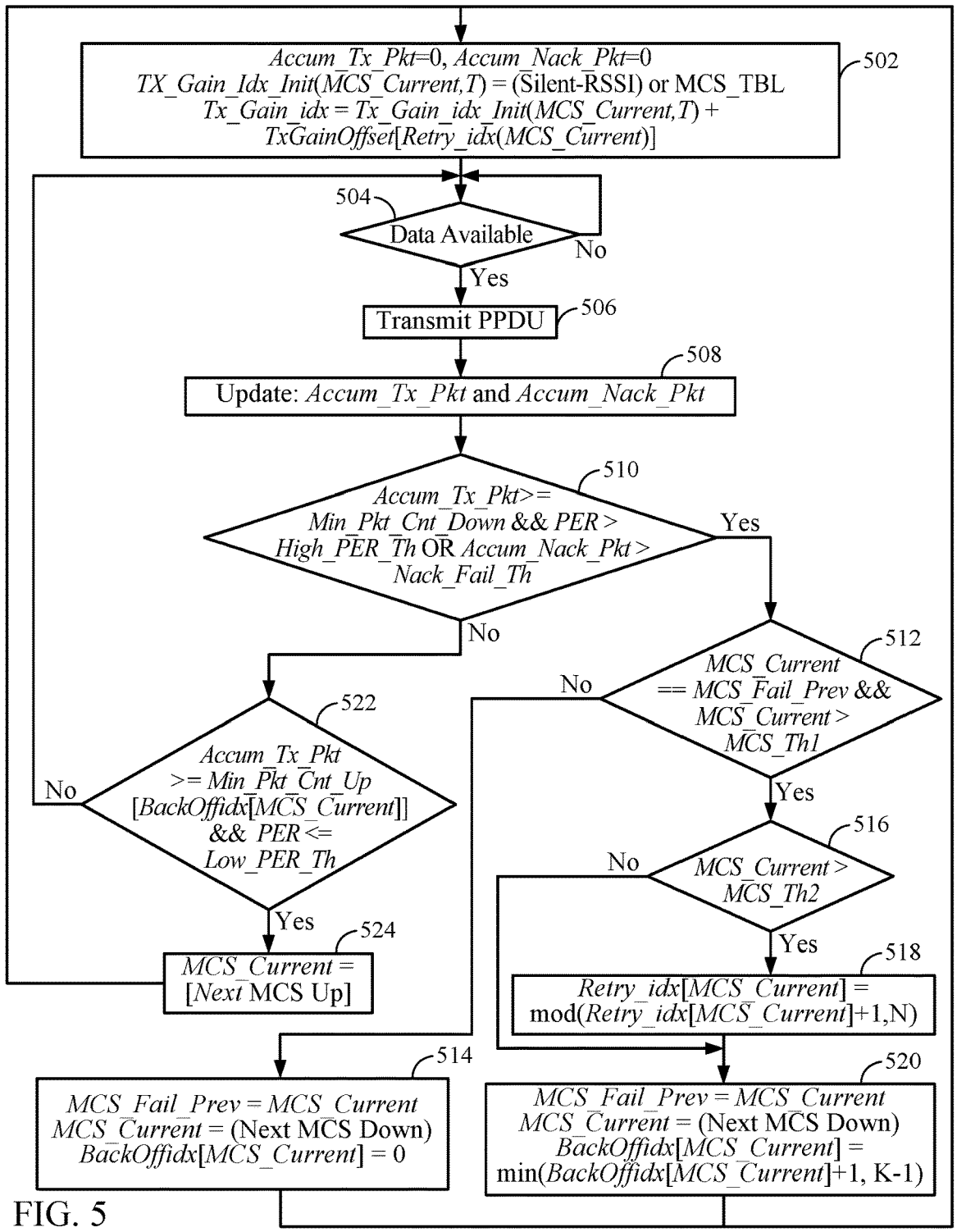
FIG. 5 illustrates a detailed flow diagram for rate selection and transmit gain selection, in accordance with certain aspects of the present disclosure.

FIG. 5 is a flowchart 500 of an example algorithm for performing joint rate selection (RS) and transmitter gain selection, e.g., using the PER statistics described above, in accordance with certain aspects of the present disclosure. In some cases, before the algorithm in FIG. 5 is performed, it may be assumed that an initial calibration has been performed and that the receiver can decode the "MCS_Select" level (e.g., the initial selected MCS value) with some initial Tx gain index.

Figure 6:
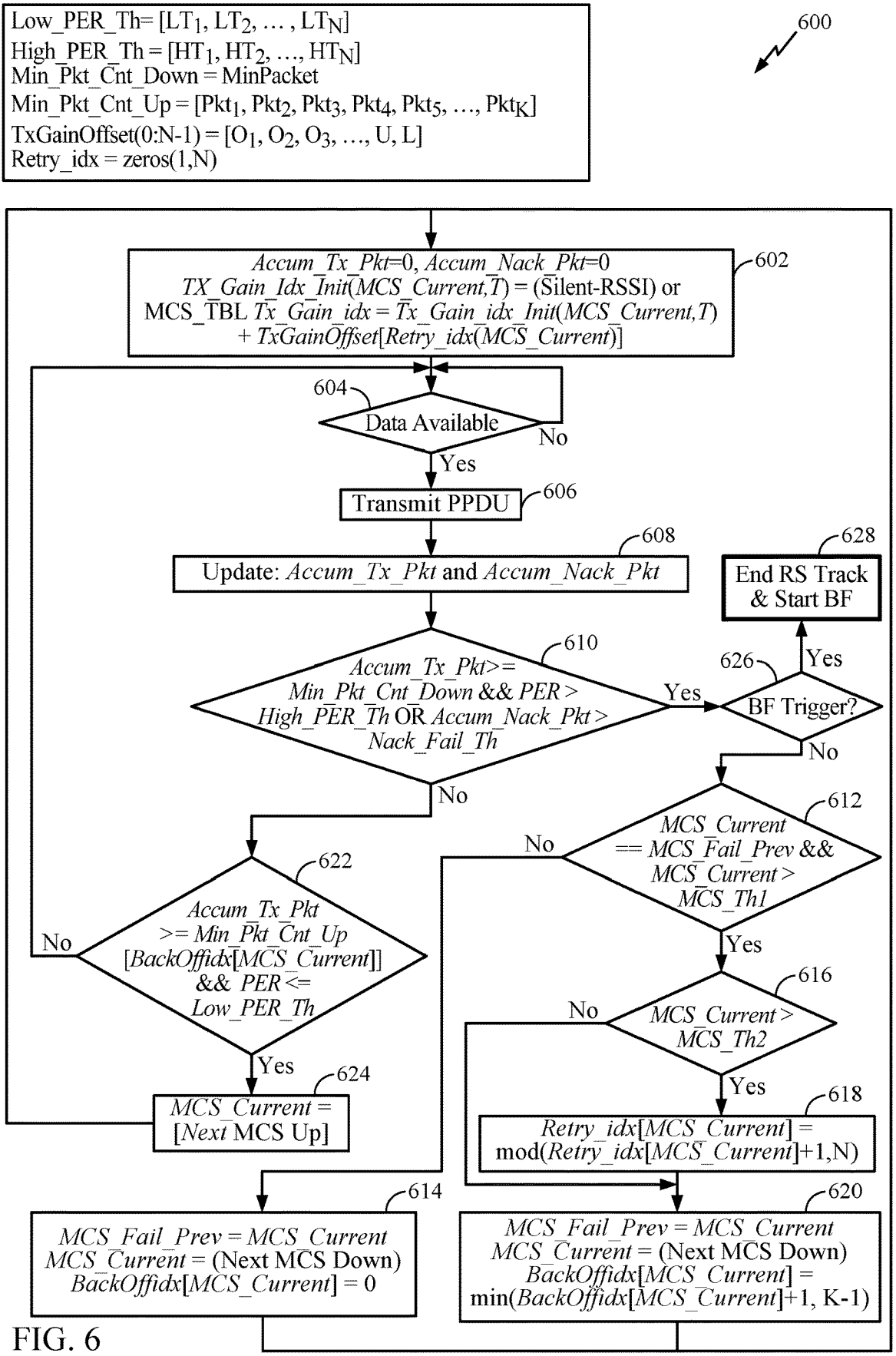
FIG. 6 illustrates another detailed flow diagram for rate selection and transmit gain selection, in accordance with certain aspects of the present disclosure.

The algorithm monitors a series of MPDU transmissions and measures PER at two main time instances. The first time instance is after Min_Pkt_Cnt_Down MPDUs have been transmitted (e.g., operation 512 of FIG. 5). In some cases, Min_Pkt_Cnt_Down may be set to a relatively small number that enables immediate reaction for a minimum outage period duration. The PER threshold (e.g., high PER threshold) in this case may be set to a higher value designed per MCS level such that it guarantees a monotonic throughput improvement across the different MCS levels. The second time instance occurs when Min_Pkt_Cnt_Up threshold is crossed (e.g., operation 520 of FIG. 5). The algorithm is designed to choose different backoff periods to reduce the frequency of MCS transmission periods after some low PER measurement occurred at a lower MCS level. If, at the second time instance, the PER is below the low PER threshold, the algorithm is expected to have a good margin of confidence to signal a higher MCS level. Note, a low PER threshold value and a high PER threshold value may be configured for each MCS value. For example, as shown in FIGS. 5 and 6, N low PER threshold values and N high PER threshold values may be configured for N MCS values.

With every packet success, the algorithm will continue to try for a higher MCS level. However, with each packet failure several actions are involved. First, an increasingly long backoff window is used in situations where there have been a consecutive number of packet failures at higher MCS levels followed by packet successes at lower MCS levels. For example, in cases where the transmitter determines there have been multiple packet failures using QAM 64, and multiple packet successes (after lowering the modulation order to QAM 16) at QAM 16, the transmitter may use a longer backoff window for packets transmitted using QAM 16 before increasing the modulation again, for example, to QAM 64. Second, the Tx gain index is modified and saved for the MCS level that has failed. This Tx gain index will be used to put the PA in different linearity regions when the same MCS is tried again in the future. Note that the algorithm assumes the backoff value and the modified Tx gain indices come from a preconfigured vector array which acts as a window that is cycled through.

In some aspects, the algorithm may assume that the following inputs are available:
1. MCS valid list—Set of valid MCS values which is application based and may be provided by higher layers;
2. Tx_Gain_Idx_Init—Based on predefined value or prior transmitter gain selection decision; and
3. MCS Current (Initial MCS)—Based on predefined value or prior MCS decision Set of valid MCS values which is application based and may be provided by higher layers.

In some cases, Tx_Gain_Idx_Init may be obtained by starting from an initial modulation order (e.g., QPSK) and putting the PA into saturation mode to maximize the transmission power to achieve the best SNR possible. However, as noted above, for higher modulation orders, maximizing the transmission power may impact the signal quality of the transmitted signal, and thus the proposed algorithm may be performed to find the optimal MCS value and transmit gain for transmitting a signal. In some cases, Tx_Gain_Idx_Init may be obtained based on a current device temperature (T). For example, the current device temperature (T) may be used in generating an initial table of gain indices for each MCS value and T. The Tx_Gain_Idx_Init may then be selected as a function of the MCS_Current and T.

At 502, counters for the accumulated number of transmitted packets (e.g., Accum_Tx_Pkt) and accumulated number of NACKs received for a group of packets (e.g., Accum_Nack_Pkt) are reset (e.g., so the algorithm may be iteratively performed each time the MCS value is changed at 514, 520, or 524). As illustrated, the transmitter gain index may be updated based on a TxGainOffset value. As described below, the TxGainOffset value may be adjusted based on whether the current MCS value is at or above a threshold value. However, it may be assumed that the TxGainOffset is initialized to zero.

At 504, the algorithm determines whether there is data available to be transmitted. If there is no available data, the algorithm remains at 504. If there is data available to be transmitted, at 506, a PPDU is transmitted (at the current MCS value) and, at 508, the counters (e.g., Accum_Tx_Pkt and Accum_Nack_Pkt) are updated.

At 510, the algorithm performs an early test to determine whether one or more early trigger conditions are satisfied (indicating that a lower rate adaptation may be warranted). In particular, the algorithm may test whether the (feedback indicates that the) accumulated number of NACKs received is above a threshold number of NACKs (e.g., Accum_Nack_Pkt>Nack_Fail_Th), whether the number of packets output for transmission is above a first threshold number of packets (e.g., Accum_Tx_Pkt≥Min_Pkt_Cnt_Down), and whether the calculated PER value is at or above a threshold PER value (e.g., PER>High_Per_Th) for the particular MCS. One or more of these conditions may indicate that a new lower rate selection is warranted (e.g., a lower MCS value is warranted if the number of packets output for transmission is above Min_Pkt_Cnt_Down and the PER is above High_Per_Th, a lower MCS value is warranted if the number of NACKs is above a NACK threshold, etc.).

At 512, the algorithm tests whether the current MCS is equal to the MCS value that failed previously and whether the current MCS is above a first threshold MCS value (e.g., MCS>4, indicating a modulation order greater than QPSK). If the test at 512 fails, the algorithm, at 514, updates the indicator for previously failed MCS to the current MCS value, selects a lower MCS value than the current MCS value, and resets the backoff index for the current MCS value. If the test at 512 passes, the algorithm, at 516, determines whether the current MCS value is above a second threshold MCS value (e.g., MCS>8) (e.g., indicating a higher modulation order, such as QAM 16 or higher, relative to the first threshold MCS value). If so, at 518, the algorithm updates the retry index for the current MCS value. At 520, the algorithm updates the indicator for previously failed MCS to the current MCS value, selects a lower MCS value than the current MCS value, and modifies the backoff index for the current MCS value.

If at 510, the algorithm does not detect an early condition for decreasing the rate selection, the algorithm may wait until a second threshold of packets (e.g., Min_Pkt_Cnt_Up)

have been accumulated before selecting a higher MCS value. As illustrated, at 522, the algorithm determines whether the number of transmitted packets is above Min_Pkt_Cnt_Up and whether the calculated PER value is at or below a second threshold PER value (e.g., Low_Per_Th) for the particular MCS value. The Min_Pkt_Cnt_Up threshold may be based on the amount of backoff for the current MCS value. If the algorithm determines that the number of transmitted packets is above or equal to Min_Pkt_Cnt_Up and that the PER is less than or equal to the second threshold PER value, the algorithm increases the MCS value at 524. If not, the algorithm continues the transmission of packets (504-506). As illustrated, the Min_Pkt_Cnt_UP threshold may be increased if the next MCS up is lower than the current MCS value and greater than the second threshold MCS value (e.g., MCS>8).

FIG. 6 is a flowchart 600 of an example algorithm for performing joint rate selection (RS) and transmitter gain selection, e.g., using the PER statistics described above, in accordance with certain aspects of the present disclosure. Operations 602-624 of FIG. 6 are similar to operations 502-524 of FIG. 5, respectively, and thus for the sake of clarity may not be described again. Compared to the algorithm in FIG. 5, the algorithm in FIG. 6 determines, based on one or more beamforming triggers, whether to perform beamforming, e.g., after detecting that a lower rate adaptation is warranted. In particular, after determining, at 610, that one or more of the early trigger conditions (for lowering the rate) are present, the algorithm, at 626, determines whether a beamforming trigger is present. Examples of beamforming triggers/conditions may include, but are not limited to, determining that the receiver is unable to respond (e.g., based on absence of a block acknowledgement (ACK), determining that throughput is below a particular threshold, failure to receive a clear-to-send (CTS) acknowledgement after multiple request-to-send (RTS) attempts, determining that overhead for sending frames is above a particular threshold, determining that a PER is above a (maximum) PER threshold, etc. If a beamforming trigger is detected at 626, the algorithm ends the rate selection and starts a beamforming process at 628. Performing an early beamforming test in this manner can reduce the likelihood that the transmitter experiences repeated failed attempts at finding the optimal rate in varying channel conditions.

Figure 7:
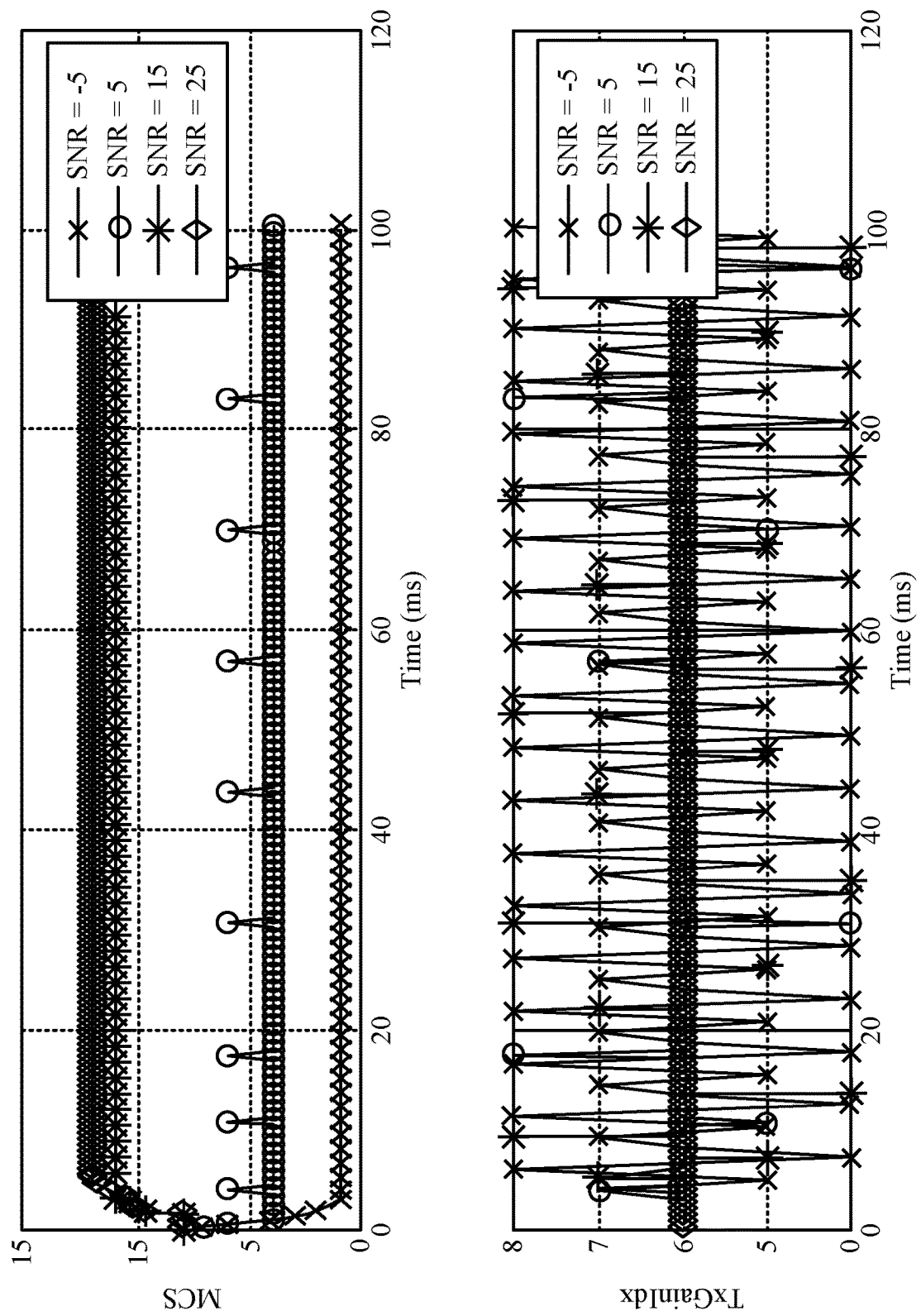
FIG. 7 illustrates an example of performance gains that may be achievable using rate selection techniques described herein, in accordance with certain aspects of the present disclosure.

The proposed algorithms described herein may provide significant advantages compared to existing solutions. For example, graph 700 of FIG. 7 shows reference signal tracking MCS and Tx gain index results for fixed SNR scenarios, in accordance with certain aspects of the present disclosure. In particular, graph 700 shows a case where the SNR is changed once across a 100 ms simulation. In this case, 4 different SNR levels are tested with corresponding target MCS levels of 1, 4, 11 and 12. As shown, the flow is able to track and optimize the MCS and the Tx gain index or PA region of linearity with a time delay on the order of a few milliseconds. By comparison, existing solutions (which do not jointly optimize for rate selection and transmitter gain selection) may require a much longer time (or may not be able) to achieve the optimal PA linear region for changing MCS levels.

Figure 8:
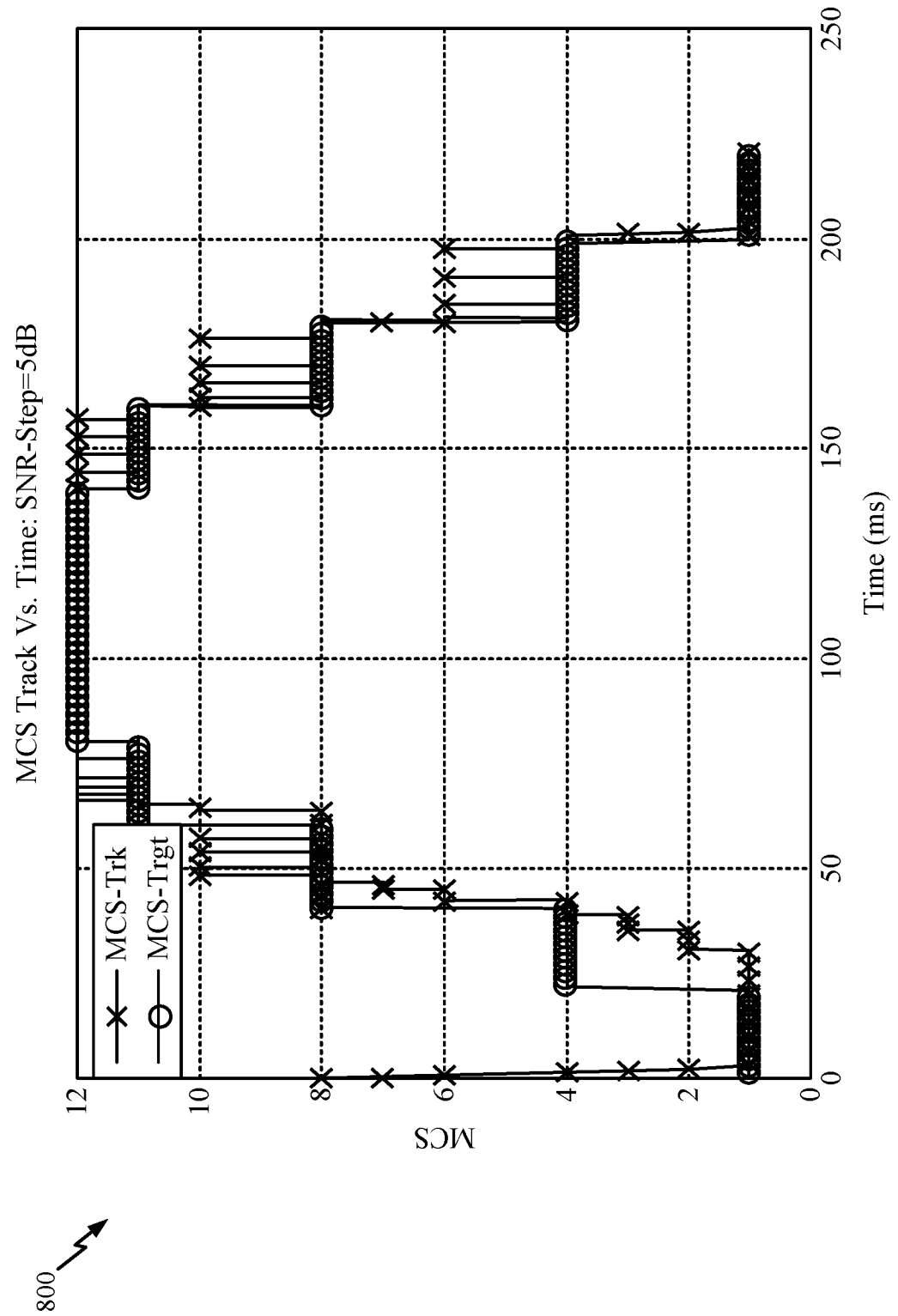
FIG. 8 illustrates another example of performance gains that may be achievable using rate selection techniques described herein, in accordance with certain aspects of the present disclosure.

Graph 800 of FIG. 8 shows another reference example of reference signal tracking performance, in accordance with certain aspects of the present disclosure. In particular, graph 800 shows performance of a dynamic system where the SNR is changed with 5 dB steps every 20 ms. As shown, the algorithm is able to track the target MCS level (shown in red) quickly (e.g., on the order of a few milliseconds). As also shown, the algorithm increases the backoff window length with each failure (preventing the ping-pong effect of repeated failures).

As shown, PER thresholds may vary for different MCS values. Further, the list of (valid) MCS values (and/or corresponding PER thresholds) may vary per application. In other words, different applications may have different MCS values in the list and/or different applications may have more or less MCS values in the list.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A.

For example, means for transmitting, means for communicating, means for increasing, means for sending, and/or means for indicating may comprise a transmitter (e.g., the transmitter unit 222) and/or an antenna(s) 224 of the access point 110, a transmitter (e.g., the transmitter unit 254) and/or antenna(s) 252 of the user terminal 120 illustrated in FIG. 2, or the (transmitter 310 of) transceiver 314 of the wireless device 302 illustrated in FIG. 3. Means for receiving may comprise a receiver (e.g., the receiver unit 222) and/or an antenna(s) 224 of the access point 110, a receiver (e.g., the receiver unit 254) and/or antenna(s) 252 of the user terminal 120 illustrated in FIG. 2, or the (receiver 312 of) transceiver 314 of the wireless device 302 illustrated in FIG. 3.

Means for calculating, means for determining, means for configuring, means for generating, means for adjusting, means for increasing, and/or means for selecting may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2, or the processor 304 of the wireless device 302 illustrated in FIG. 3.

According to certain aspects, means may be implemented by processing systems configured to perform the corresponding functions by implementing various algorithms (e.g., in hardware or by executing software instructions) described above for performing rate selection and/or transmit gain selection. For example, the processing system may be configured to perform an algorithm for selecting a second MCS value for second packets based on the feedback, and adjusting the transmit gain parameter if one or more criteria are met.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a first bus interface configured to output first packets for transmission using a first modulation and coding scheme (MCS) level of a plurality of MCS levels and via a transmit power amplifier (PA) configured according to a transmit gain parameter associated with the first MCS level, wherein each of the plurality of MCS levels is associated with a modulation order;
   a second bus interface configured to obtain first feedback indicating whether the first packets have been received; and
   a processing system configured to:
      select a second MCS level of the plurality of MCS levels for second packets based on the first feedback, comprising setting the second MCS level to a MCS level higher than the first MCS level upon determining that a first threshold number of the first packets have been output for transmission; and
      adjust the transmit gain parameter when one or more criteria are met; wherein:
         the first bus interface is also configured to output the second packets for transmission using the second MCS level and thereafter to output additional packets for transmission based on the first MCS level and the adjusted transmit gain parameter;
         the second bus interface is also configured to obtain second feedback indicating whether the second packets have been received; and
         after the second packets have been output for transmission, the processing system is also configured to increase the first threshold number and select the first MCS level for the additional packets upon determining that (1) the second feedback indicates a second threshold number of the second packets have not been received and (2) the second MCS level is greater than a first MCS level threshold.

2. The apparatus of claim 1, wherein the one or more criteria comprise:
   the second feedback indicating the second threshold number of the second packets have not been received;
   the second MCS level is greater than the first MCS level threshold and a second MCS level threshold; and
   the first MCS level used for the additional packets is lower than the second MCS level.

3. The apparatus of claim 2, wherein the second MCS level threshold is greater than the first MCS level threshold.

4. The apparatus of claim 1, wherein the processing system is configured to set the second MCS level to the MCS level higher than the first MCS level upon further determining that a packet error rate (PER) is at or below a threshold PER value associated with the first MCS level.

5. The apparatus of claim 1, wherein:
   the processing system is configured to increase the first threshold number and select the first MCS level for the additional packets upon further determining that the second MCS level is greater than a second MCS level threshold; and
   the second MCS level threshold is greater than the first MCS level threshold.

6. The apparatus of claim 1, wherein the processing system is configured to select the first MCS level for the additional packets upon further determining that (1) a third threshold number of the second packets have been output for transmission and (2) a packet error rate (PER) is above a threshold PER value associated with the second MCS level.

7. The apparatus of claim 1, wherein the modulation order associated with the first MCS level is lower than the modulation order associated with the second MCS level.

8. A method for wireless communications by an apparatus, comprising:
outputting first packets for transmission using a first modulation and coding scheme (MCS) level of a plurality of MCS levels and via a transmit power amplifier (PA) configured according to a transmit gain parameter associated with the first MCS level, wherein each of the plurality of the MCS levels is associated with a modulation order;
obtaining first feedback indicating whether the first packets have been received;
selecting a second MCS level of the plurality of MCS levels for second packets based on the first feedback, comprising setting the second MCS level to a MCS level higher than the first MCS level upon determining that a first threshold number of the first packets have been output for transmission;
adjusting the transmit gain parameter when one or more criteria are met;
outputting the second packets for transmission using the second MCS level;
obtaining second feedback indicating whether the second packets have been received; and
after the second packets have been output for transmission:
increasing the first threshold number and selecting the first MCS level for additional packets upon determining that (1) the second feedback indicates a second threshold number of the second packets have not been received and (2) the second MCS level is greater than a first MCS level threshold; and
outputting the additional packets for transmission based on the first MCS level and the adjusted transmit gain parameter.

9. The method of claim 8, wherein the one or more criteria comprise:
the second feedback indicating the second threshold number of the second packets have not been received;
the second MCS level is greater than the first MCS level threshold and a second MCS level threshold; and
the first MCS level used for the additional packets is lower than the second MCS level.

10. The method of claim 9, wherein the second MCS level threshold is greater than the first MCS level threshold.

11. The method of claim 8, wherein the second MCS level is set to the MCS level higher than the first MCS level upon further determining that a packet error rate (PER) is at or below a threshold PER value associated with the first MCS level.

12. The method of claim 8, wherein:
the first threshold number is increased and the first MCS level is selected for the additional packets upon further determining that the second MCS level is greater than a second MCS level threshold; and
the second MCS level threshold is greater than the first MCS level threshold.

13. The method of claim 8, wherein the first MCS level is selected for the additional packets upon further determining that (1) a third threshold number of the second packets have been output for transmission and (2) a packet error rate (PER) is above a threshold PER value associated with the second MCS level.

14. The method of claim 8, wherein the modulation order associated with the first MCS level is lower than the modulation order associated with the second MCS level.

15. A wireless station, comprising:
a transmitter configured to transmit first packets using a first modulation and coding scheme (MCS) level of a plurality of MCS levels and via a transmit power amplifier (PA) configured according to a transmit gain parameter associated with the first MCS level, wherein each of the plurality of the MCS levels is associated with a modulation order;
a receiver configured to receive first feedback indicating whether the first packets have been received; and
a processing system configured to:
select a second MCS level of the plurality of MCS levels for second packets based on the first feedback, comprising setting the second MCS level to a MCS level higher than the first MCS level upon determining that a first threshold number of the first packets have been output for transmission; and
adjust the transmit gain parameter when one or more criteria are met; wherein:
the transmitter is also configured to transmit the second packets using the second MCS level and thereafter to transmit additional packets based on the first MCS level and the adjusted transmit gain parameter;
the receiver is also configured to receive second feedback indicating whether the second packets have been received; and
after the second packets have been transmitted, the processing system is also configured to increase the first threshold number and select the first MCS level for the additional packets upon determining that (1) the second feedback indicates a second threshold number of the second packets have not been received and (2) the second MCS level is greater than a first MCS level threshold.

16. The wireless station of claim 15, wherein the one or more criteria comprise:
the second feedback indicating the second threshold number of the second packets have not been received;
the second MCS level is greater than the first MCS level threshold and a second MCS level threshold; and
the first MCS level used for the additional packets is lower than the second MCS level.

17. The wireless station of claim 16, wherein the second MCS level threshold is greater than the first MCS level threshold.

18. The wireless station of claim 15, wherein the processing system is configured to set the second MCS level to the MCS level higher than the first MCS level upon further determining that a packet error rate (PER) is at or below a threshold PER value associated with the first MCS level.

19. The wireless station of claim 15, wherein:
the processing system is configured to increase the first threshold number and select the first MCS level for the additional packets upon further determining that the second MCS level is greater than a second MCS level threshold; and
the second MCS level threshold is greater than the first MCS level threshold.

20. The wireless station of claim 15, wherein the processing system is configured to select the first MCS level for the additional packets upon further determining that (1) a third threshold number of the second packets have been transmitted and (2) a packet error rate (PER) is above a threshold PER value associated with the second MCS level.

\* \* \* \* \*